Nov. 18, 1958    E. A. CASTNER    2,860,441
WEEDLESS LURE
Filed July 19, 1957
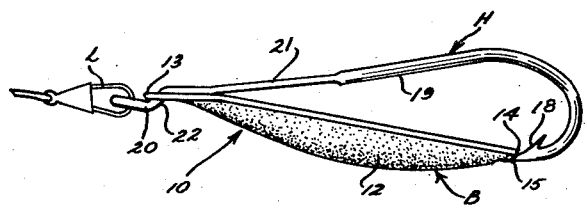
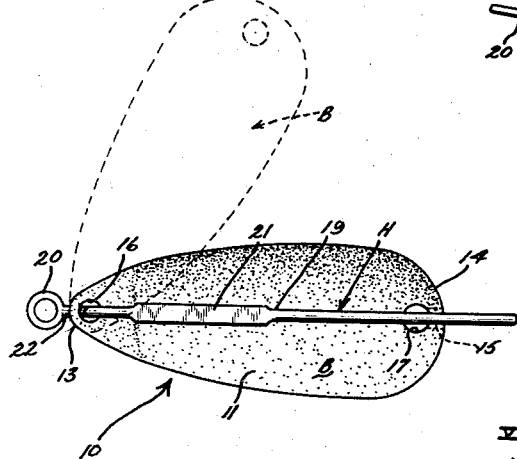
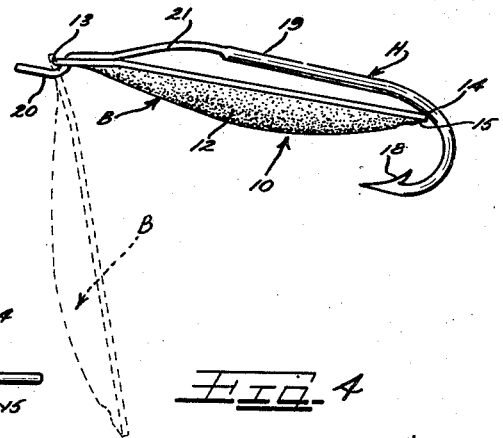
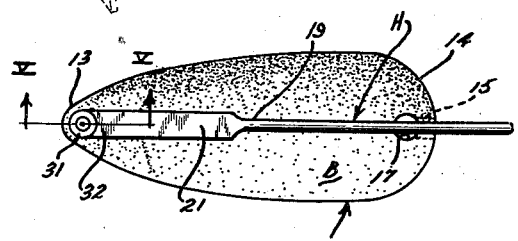
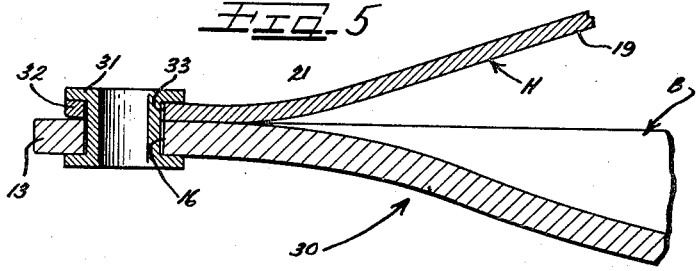
Inventor
EARL AUGUST CASTNER

United States Patent Office 2,860,441
Patented Nov. 18, 1958

2,860,441

WEEDLESS LURE

Earl August Castner, Justice, Ill.

Application July 19, 1957, Serial No. 673,052

2 Claims. (Cl. 43—42.5)

This invention relates to an improved weedless fishing lure, and in particular relates to an improved weedless lure in which the lure body is free to revolve about the shank portion of the hook upon disengagement from the barbed end thereof, after the lure has been struck by a fish.

One of the disadvantages of weedless type fish lures has been the increased possibilities of losing a fish that has struck short, or is otherwise insecurely hooked, due to the interference of the weed repelling structure adjacent the barbed portion of the hook. In addition to considerably reducing the chances of securely hooking a fish in the first instance, the weed repelling structure of a typical weedless lure was prone to interference with the barbed action of the hook once a fish was hooked, such that in retrieving a fish that had struck short, the weed repelling structure or lure body itself would often times cause the fish to become disengaged from the hook and thus the catch would be lost.

The present invention offers a solution to each of these problems in the form of an improved weedless lure of the type that is adapted to be cast or trolled, wherein the connection between the hook and lure body is such as to render the lure substantially weedless while being retrieved from a cast or troll, and in which the lure body is free to move out of the plane of the hook after being struck by a fish, thereby substantially eliminating any interference between the lure body and the barbed end of the hook after a strike and enhancing the chances of retrieving a fish that has struck short or is otherwise insecurely hooked.

It is an object then of the present invention to provide an improved weedless lure of the type that is adapted to be cast or trolled, and which minimizes interference between the lure body and barbed end portion of the hook of the lure.

Another object of the present invention is to provide an improved weedless lure wherein the barbed portion of the hook will normally be biased into a nested weedless engagement with the lure body while the lure is being retrieved from a cast or troll, and wherein the lure body will be free to revolve around the shank portion of the hook after having been disengaged from the barbed end of the hook.

A further object of the present invention is to provide a weedless lure in which the body portion of the lure is free to revolve or dangle from its connection to the shank portion of an attached hook after disengagement from the barbed end thereof without loss of the lure body, thereby to enhance the possibilities of retrieving a fish that has struck short or is otherwise insecurely hooked.

Another object of the present invention is to provide an improved type of weedless fish lure in which interference between the weedless structure of the lure and the barbed end of the hook is minimzed, thereby reducing the likelihood of losing a catch that may have struck short or was otherwise insecurely hooked.

A further object of the present invention is to provide an improved type of weedless fish lure that is of a simple construction, economical to manufacture, and is easy to operate.

Many other objects and advantages will be realized by those versed in the art upon making reference to the drawings and to the detailed description that follows, which form a part of this specification, and in which like reference numerals and letters have been used to identify identical parts.

In the drawings:

Figure 1 is a side elevational view of the present invention, showing the normal position of the lure while being trolled or retrieved from a cast;

Figure 2 is a view similar to Fig. 1, but showing the hook portion of the lure depressed to expose the barbed portion of the hook, such as would occur after a fish has struck;

Figure 3 is a top plan view of the lure, showing in dotted line how the body portion of the lure is free to revolve about the shank of the hook, after the lure has been struck by a fish;

Figure 4 is a top plan view of a modified form of the invention; and

Figure 5 is an enlarged broken sectional view showing the connection of the shank of the hook to the lure body, taken substantially along the line V—V of Fig. 4.

As shown on the drawings:

In Figs. 1–3, a preferred form of the weedless lure of the present invention is illustrated, and designated generally by the reference numeral 10. The weedless lure 10 generally comprises a lure body member B, and a hook H.

The lure body member B may be of any desired shape, but in the exemplary form illustrated in Figs. 1–3, is of a generally dished, or spoon shape, having an upper concave surface 11 and a lower convex surface 12. The lure body B thus is of a generally oval plan, having a small radius leading end portion 13 and a larger radius trailing end portion 14 (Fig. 3). The leading end portion 13 and trailing end portion 14 are bored, as at 16 and 17 (Fig. 3), respectively for purposes to be more fully explained later.

It should be understood that while a spoon-shaped, concavo-convex lure body member B has been illustrated in Figs. 1–3, any other suitable lure body shape could be utilized instead, depending upon the action desired, the depth at which the lure is to operate, and the type of fish sought to be attracted.

The hook H is of the conventional type, to the extent that it includes a barbed end 18, a shank 19, and an eye 20. The hook H differs, however, from a conventional hook, in that its shank 19 is flattened as at 21, for a portion of its length, in order to provide a flex point for the hook and to bias the barbed end 18 into engagement with the trailing end 14 of the lure body B, as will be explained in more detail as the description proceeds.

As best shown in Figs. 1 and 3, the shank portion 19 of the hook H, in addition to having a flattened portion 21, is also formed with an offset 22 (Fig. 1), adjacent the eye 20 of the hook, such that the eye portion 20 and the flattened shank portion 21 of the hook H are offset from each other by a distance substantially equal to the thickness of the lure body B. As best illustrated in Fig. 3, the bore 16 in the leading end portion 13 of the lure body B is so sized as to receive the offset portion 22 of the hook in loose fitting engagement, such that the lure body B is free to dangle and rotate about the offset 22 when disengaged from its retained position between the offset 22 and the barbed end 18 of the hook H, for a purpose and function to be explained in more detail later.

In order to provide the weedless feature of the invention the lower convex surface 12 of the lure body B is formed with a longitudinally extending recess 15, that extends generally collinear with the lure body in the zone between the trailing end extremity 14 and the bore 17, such as to permit a nested engagement of the barbed end 18 of the hook with the lure body B when the lure assembly 10 is in a trolling or casting position (Figure 1).

It should be noted that the distance between the offset 22 and barb 18 of the hook H is critical to the efficient operation of the weedless feature of the invention, in that the spacing between the bores 16 and 17 and the longitudinal orientation of the lure body B, must be such as to insure an adequate overlap and indexing of the barbed end 18 of the hook H in the bore 17 and recess 15. Thus the length of the shank portion 19 of the hook H and the position of the offset 22 must correspond to the spacing between the bore 16 in the leading end of the lure body and the bore 17 in the weedless retaining recess 15 in the trailing end of the lure body B.

In addition, the contours of the concave leading end portion 13 of the lure body B and the angular relationship of the shank portion of the hook H, adjacent the offset 22, must be such as to provide a biasing force to urge the barb 18 of the hook into the retaining recess 15 in the lure body B.

The length of the flattened portion 21 and the degree of angularity of the shank 19 of the hook H, adjacent the offset 22, is largely determined by the overall size of the lure assembly 10, which will require a corresponding increasing or decreasing compression effort to disengage the barbed end 18 of the hook from the trailing end portion 14 of the lure body B with an increasing or decreasfroming size of the lure assembly 10.

Thus, where a smaller overall lure assembly is contemplated, such as would be used to attract smaller fish, the amount of compressive effort required to flex the flattened portion 21 of the hook H and disengage the lure body B from the barbed end of the hook 18 (Figure 2), would be proportionally less than a correspondingly larger assembly such as would be used to attract larger game fish.

In the operation of the preferred form the weedless lure assembly 10, illustrated in Figures 1–3, the lure body B is initially moved into collinear retained engagement of the offset portion 22 and barbed end 18 of the hook H, either by flexing the barbed end portion 18 away from the trailing end 14 of lure body, so as to permit the lure body to be swung under the barbed end of the hook and the barb to thereafter be moved into its nested weedless casting or trolling position, or by pivoting the lure body B around the offset 22 laterally and thereafter swinging the trailing end portion 14 of the lure body B over the barb 18 until it comes into nested engagement in the receiving recess 15 in the trailing end portion 14 of the lure body B.

When the lure body B and hook H are each positioned in the relationship illustrated in Figure 1, the lure assembly 10 may be cast into weeds, or other areas likely to foul a conventional lure, without this danger, as the barbed end 18 is in nested protected relationship in the trailing end 14 of the lure body B.

Assuming next that a fish has struck the lure assembly 10 in such manner as to compress the lure body B and hook H toward each other and thereby disengage the barbed end 18 of the hook from its retained position in the recess 15, the lure assembly 10 will assume the configuration illustrated in solid line in Figure 2, and permit the barb 18 to be impaled in the lower jaw of the fish. Once the trailing end 14 of the lure body B has been displaced from its retained position on the hook H (Figure 1), the lure body B will be free to pivot or freely dangle from the offset portion 22 of the hook H as illustrated in dotted line in Figure 2, thus eliminating any interference by the lure body B with the barbed end of the hook H while the lure assembly 10 and fish are being retrieved.

This feature is particularly desirable, in that in former weedless lures devices, excessively large compression forces were requires to release the hook from its weedless position, which forces also tended to disengage the hook from the jaw of the fish and often-times resulted in a loss of the fish that had struck short or was otherwise insecurely hooked. By permitting the body portion B of the lure to dangle freely from the offset 22 of the hook H after disengagement of the barbed end therefrom, the possibilities of losing the fish are thus considerably reduced. The general position of the lure body B in its freely dangling position from the offset 22 after having been disengaged from the barbed end 18, is illustrated in dotted line in Figure 2.

Thus, it will be appreciated that the weedless lure assembly 10, illustrated in Figures 1–3, discloses an improved weedless fishing lure, that will substantially enhance the possibilities of retrieving a fish that has struck short or is insecurely hooked, due to the elimination of interference between the lure body B and the barbed end of the hook H.

Referring now to Figures 4 and 5 a modified form of the weedless lure of the invention is illustrated, and designated generally by the reference numeral 30.

The modified weedless lure 30 is substantially similar to the weedless lure assembly 10, in that it includes a concavo-convex elliptical lure body B and a hook H, but differs from the weedless lure 10 in the manner of attachment of the lure body B to the shank portion 19 of the hook H.

As best shown in Figure 4, the hook H is fastened to the lure body B at its leading end portion 13 by a hollow rivet 31 which extends through the bore 16 (Figure 5) in the leading end portion 13 of the lure body B. The outer diameter and upset portion of the rivet 31 are such as to accommodate relative rotational movement between the hook H and lure body B about a pivot axis defined by the rivet 31, thereby permitting the lure body B to swing free of the barb 18 of the hook after having been disengaged therefrom in a manner similar to the operation of the weedless lure 10.

To this end, the shank portion 19 of the hook H on the modified weedless lure 30 has its flattened shank portion 21 extending to its end extremity 32, which is bored as at 33 (Figure 5) to accommodate a loose fitting engagement with the shank portion of the rivet 31.

Thus, the shank portion 19 of the hook H in the modified weedless lure 30 forms a bearing plate between the upset head of the rivet 31 and the leading end portion 13 of the lure body B that will accommodate relative pivotal movement therebetween to accomplish the principles of the invention.

As illustrated in Figures 4 and 5, the rivet 31 is hollow to facilitate attachment of the lure to a snap fastener or leader such as the leader L (Fig. 1). It should be understood, however, that other points and means of attachment could be utilized to connect the modified weedless lure 30 to a lure, rather than through the hollow rivet 31, as may be desired.

In operation, after the extended flattened shank portion 21 on the hook H of the weedless lure 30 has been appropriately bored to loosely receive the hollow shank portion of the rivet 31, and the leading end portion 13 of the spoon body B has been similarly bored as at 16, these two components are assembled as illustrated in Figures 4 and 5, such that the barbed end of the hook H will normally be biased into nested engagement in a receiving recess 15 in the trailing end portion 14 of the lure body B, to thus provide the weedless features of the invention while being retrieved from a cast or troll, as previously described.

To this end, it may be necessary to bend the end extremity 32 of the flattened shank portion 21 of the hook H away from the lure body 13 before assembly, as illustrated in Fig. 5, in order to assure a suitable biasing action of the barbed end of the hook into the receiving recess 15 in the trailing end portion of the lure body B.

The extent of reverse bending of the end extremity 32 of the flattened shank portion 21 of the hook H is largely a matter of choice, and can be readily adjusted by a user by swinging the lure body B to the dotted line position illustrated in Figure 3, and thereafter bending the end portion 32 of the hook H to provide the desired spring tension.

After the hook H has been pivotally connected to the lure body B by the rivet 31, the operation of the weedless features and the minimizing of interference between the lure body with the barbed end of the hook is substantially identical with the lure assembly 10, in that once a fish has struck the lure, and the barb 18 of the hook H has been depressed away from the lure body B and out of engagement with the retaining recess 15 formed therein, the lure body B of the modified weedless lure 30 will be free to pivot about the rivet 31 to some angular position such as indicated in dotted line in Figure 3, thereby minimizing interference between the trailing end portion 14 of the lure body B and the barbed end 18 of the hook H.

The riveted connection between the hook H and lure B of the modified weedless lure 30, does not permit the lure body B to dangle freely from the shank portion of the hook once disengaged therefrom, as in the weedless lure assembly 10, due to the more restricted tolerances of the riveted connection of the modified weedless lure 30. This type of attachment however, provides a generally stronger connection between the hook and lure body, and insures positive alignment of the barbed end of the hook in the retaining recess in the trailing end of the lure body.

It will thus be appreciated that the present invention discloses an improved weedless fish lure that substantially enhances the possibilities of retrieving a fish that has struck short or is otherwise insecurely hooked, by providing a pivotal mount between the body and hook portion of the lure, such that once the barbed end of the hook has been depressed out of engagement with a retaining recess in the trailing end of the lure body, the lure body will be free to dangle or pivot about its mounting and thus eliminate any interference between the lure body and the impaled portion of a fish on the hook. In this way, a fish that has struck short or was otherwise insecurely hooked is more likely to be retrieved.

While only two embodiments of the invention have been herein disclosed and described, it should be understood that various modifications and variations may be effected without departing from the scope of the novel concepts herein disclosed.

I claim as my invention:

1. In a fishing lure, an elongated lure body with a lower convex surface and a concave upper surface and having an apertured leading end portion and a recessed and apertured trailing end portion, a hook having an eye, an elongated shank, and a barbed end portion, said eye being downwardly offset from said shank portion, the forward portion of the shank of said hook having a flattened portion in a plane transverse to the plane of the hook and of greater width than the thickness of the offset portion of said hook, said flattened portion of the hook being elevated above the lure body when in service position and resilient to accommodate flexing movement of the hook between the eye and the barbed end thereof, the barbed end of said hook forming a downwardly directed hook with the barbed end portion thereof extending forwardly and adapted to receive the recessed trailing end portion of the lure body by placing the end of the hook in the aperture in the trailing end portion when in service position for fishing, said lure body mounted on the hook by placing the aperture in the leading end portion over the shank of the hook between the eye and the flattened portion permitting the lure body to dangle freely therefrom, said recessed trailing end portion of the lure body capable of being biased into engagement with the barbed end of the hook when in service position for fishing by the intersecting engagement of the offset portion of the hook with the leading end portion of the lure body at the leading end thereof, and said lure body also being disengageable from the barbed end of said hook when a fish bites on the lure and pushes the recessed portion of the trailing end portion of the lure body out of its engaged relation with the barbed end of the hook, and said lure body with its recesses therein and said downwardly extending hook serving to protect each other to a great extent from the entanglement with weeds when used in water containing the same when in service position.

2. In a fishing lure, an elongated lure body with a lower convex surface and a concave upper surface and having an apertured leading end portion and a recessed and apertured trailing end portion, a hook having an eye, an elongated shank, and a barbed end portion, the said eye being in the forward end portion of said shank portion, the forward end portion of said shank of said hook consisting of a flattened portion in a plane transverse to the plane of the hook and of greater width than the thickness of the rearward portion of the shank, the rear section of said flattened portion of said shank being elevated above the lure body when in service position and resilient to accommodate flexing movement of the hook between the eye and the barbed end thereof, the barbed end of said hook forming a downwardly directed hook with the barbed end portion thereof extending forwardly and adapted to receive the recessed trailing end portion of the lure body by placing the end of the hook in the aperture in the trailing end portion when in service position for fishing, said lure body mounted on the hook by placing the aperture in the leading end portion thereof below the eye of the hook and riveting the same together permitting relative pivotal movement of the lure body with the hook, said recessed trailing end portion of the lure body capable of being biased into engagement with the barbed end of the hook when in service position for fishing by the intersecting engagement of the lure body with said hook and said rivet, and said lure body also being disengageable from the barbed end of said hook when a fish bites on the lure and pushes the recessed portion of the trailing end portion of the lure body out of its engaged relation with the barbed end of the hook, and said lure body with its recesses therein and said downwardly extending hook serving to protect each other to a great extent from entanglement with weeds when used in water containing the same when in service position.

References Cited in the file of this patent

UNITED STATES PATENTS

| Number | Name | Date |
|---|---|---|
| 378,678 | Harlow | Feb. 28, 1888 |
| 390,028 | Loftie | Sept. 25, 1888 |
| 2,090,571 | Coffin | Aug. 17, 1937 |
| 2,168,476 | Hartung | Aug. 8, 1939 |
| 2,255,222 | Leusch | Sept. 9, 1941 |
| 2,462,437 | Tallaksen | Feb. 22, 1949 |
| 2,477,488 | Larson | July 26, 1949 |